US012724224B2

(12) United States Patent
Wang et al.

(10) Patent No.: US 12,724,224 B2
(45) Date of Patent: Sep. 1, 2026

(54) METHOD FOR CONSTRUCTING INITIAL STRUCTURE OF ATHERMAL OPTICAL SYSTEM BASED ON PARTICLE SWARM OPTIMIZATION ALGORITHM

(71) Applicant: XI'AN INSTITUTE OF OPTICS AND PRECISION MECHANICS OF CAS, Xi'an (CN)

(72) Inventors: Hu Wang, Xi'an (CN); Xingyan Wang, Xi'an (CN); Yaoke Xue, Xi'an (CN); Yang Shen, Xi'an (CN); Shangmin Lin, Xi'an (CN); Qinfang Chen, Xi'an (CN); Meiying Liu, Xi'an (CN); Yang Liu, Xi'an (CN); Canglong Zhou, Xi'an (CN); Zhen Wang, Xi'an (CN); Yue Pan, Xi'an (CN); Jie Liu, Xi'an (CN); Yongjie Xie, Xi'an (CN)

(73) Assignee: XI'AN INSTITUTE OF OPTICS AND PRECISION MECHANICS OF CAS, Xi'an (CN)

( * ) Notice: Subject to any disclaimer, the term of this patent is extended or adjusted under 35 U.S.C. 154(b) by 0 days.

(21) Appl. No.: 18/983,270

(22) Filed: Dec. 16, 2024

(65) Prior Publication Data

US 2025/0347887 A1 Nov. 13, 2025

(30) Foreign Application Priority Data

May 11, 2024 (CN) ........................ 202410580457.8

(51) Int. Cl.
*G02B 7/02* (2021.01)
*G06F 30/25* (2020.01)
(Continued)

(52) U.S. Cl.
CPC ............ *G02B 7/028* (2013.01); *G06F 30/25* (2020.01); *G06F 2111/10* (2020.01); *G06F 2119/08* (2020.01)

(58) Field of Classification Search
CPC ............................... G02B 7/008; G02B 7/028
See application file for complete search history.

(56) References Cited

FOREIGN PATENT DOCUMENTS

CN 109164575 A 1/2019
CN 110764257 * 11/2019 ............ G06N 3/006
(Continued)

*Primary Examiner* — Joseph P Martinez

(57) ABSTRACT

The present disclosure relates to a method for constructing the initial structure of an athermal optical system, specifically relating to a method for constructing the initial structure of an athermal optical system based on particle swarm optimization algorithm, which is used to solve the shortcomings of the current athermal optical system designs where optical design software heavily relies on the initial structure of the athermal optical system, and the construction of the initial structure does not consider the selection of optical materials, resulting in extremely low efficiency of the athermal optical system designs. The method for constructing the initial structure of an athermal optical system based on particle swarm optimization algorithm provides a new design concept for the athermal optical system, which achieves a reasonable match between optical materials and mechanical materials in the initial structure stage and improves the efficiency of subsequent design optimization.

12 Claims, 8 Drawing Sheets

(51) Int. Cl.

| | |
|---|---|
| *G06F 111/10* | (2020.01) |
| *G06F 119/08* | (2020.01) |

(56) References Cited

FOREIGN PATENT DOCUMENTS

| | | | |
|---|---|---|---|
| CN | 110764257 | A | 2/2020 |
| CN | 111274673 | A | 6/2020 |
| CN | 113900249 | A | 1/2022 |
| WO | 2023169062 | A1 | 9/2023 |
| WO | 2023179152 | A1 | 9/2023 |

* cited by examiner

METHOD FOR CONSTRUCTING INITIAL STRUCTURE OF ATHERMAL OPTICAL SYSTEM BASED ON PARTICLE SWARM OPTIMIZATION ALGORITHM

CROSS-REFERENCE TO RELATED APPLICATIONS

This application claims to the benefit of priority from Chinese Application No. 202410580457.8 with a filing date of May 11, 2024. The content of the aforementioned applications, including any intervening amendments thereto, are incorporated herein by reference.

TECHNICAL FIELD

The present disclosure relates to a method for constructing the initial structure of an athermal optical system, in particular to a method for constructing an initial structure of an athermal optical system based on particle swarm optimization algorithm.

BACKGROUND

With the progress of space science and technology, the performance requirements of optical instruments for space exploration are constantly increasing. The change in environmental temperature has a significant impact on the stable operation of an athermal optical system, especially in technical fields such as space exploration, and these environmental conditions are often very harsh and variable. Temperature changes can cause deformation of optical elements and supporting structures, leading to defocusing of the image plane in the athermal optical system and affecting imaging quality. Therefore, when designing an athermal optical system, temperature factors must be taken into account, and an athermal design must be adopted to ensure that the athermal optical system can maintain stable performance in a wide temperature range and ensure imaging quality.

The existing design methods for athermal optical systems mainly include two steps: first, designing an athermal optical system that meets the requirements at room temperature; second, optimizing it several times at different temperatures through material replacement and structural adjustment to achieve the design objectives. This method does not fully consider the selection of optical materials and imaging quality optimization during the initial design, but adjusts the high-low temperature conditions after the design is completed. This not only reduces design efficiency, but also puts forward high demands for the professional ability of designers.

Besides, there are also shortcomings in the method of obtaining the initial structure. One method is the analytical method (PW method), which calculates the structural parameters that meet the requirements based on primary aberration theory. However, this process is complex and only applicable to simple athermal optical systems. Another method is the scaling method, which involves finding a system in existing patents or lens libraries that is close to the design requirements as a starting point, and then adjusting the system through focal length scaling and optimization. This is usually a process with time-consuming and based on trial and error, and if the initial structure is not chosen properly, the optimization process may be very long, sometimes it is even necessary to re-select the initial structure.

Therefore, there is an urgent need for a method for constructing the initial structure of an athermal optical system, which can achieve automatic optimization of the initial structure of an athermal optical system, automatic matching of materials, and improve the efficiency of the athermal system design.

SUMMARY

The objective of the present disclosure is to provide a method for constructing the initial structure of an athermal optical system, in order to solve the deficiencies of current optical design software in the design of athermal optical systems that heavily relies on the initial structure of the athermal optical system and does not consider the selection of optical materials in the construction of the initial structure, resulting in extremely low efficiency in the design of athermal optical systems.

In order to solve the deficiencies of the prior art mentioned above, the present disclosure provides the following technical solutions:

A method for constructing the initial structure of an athermal optical system based on particle swarm optimization algorithm, including the following steps:

Step 1: calculating design specifications of the athermal optical system based on application requirements;

The design specifications include various indicators such as operating wavelength band, operating temperature range, focal length, field of view angle, aperture, number of lenses, object distance, image distance, total system length, and image quality requirement;

Step 2: taking the design specifications from step 1 as an input, obtaining main structural parameters of the initial structure of the athermal optical system through the particle swarm optimization algorithm;

Step 2.1: according to the number of lenses in the athermal optical system, taking the focal length and chromatic aberration of the athermal optical system as preliminary optimization objectives, establishing an evaluation function $F_1$ according to the preliminary optimization objectives, and obtaining a set of optimal solutions using the particle swarm optimization algorithm, the optimal solutions comprise optical power $\phi$ and Abbe number V of material of each lens;

Step 2.2: taking chromatic aberration and thermal aberration of the athermal optical system as optimization objectives, and establishing an evaluation function $F_2$ according to the optimization objectives; substituting the optimal solutions obtained in step 2.1 into the evaluation function $F_2$, optimizing an material combination of the athermal optical system using particle swarm optimization algorithm, and obtaining a set of optimal solutions, including the Abbe number V a material, relative dispersion P, and thermal aberration coefficient $\gamma$ of each lens;

Step 2.3: taking a focal length of the athermal optical system as the optimization objective, and establishing an evaluation function $F_3$ according to the optimization objective; substituting the optimal solutions obtained in steps 2.1 and 2.2 into the evaluation function $F_3$, optimizing curvature radius of each lens using the particle swarm optimization algorithm, and obtaining a set of optimal solutions, including a first surface curvature radius and a second surface curvature radius of each lens;

Step 2.4: taking the optical power $\phi$ of each lens obtained in step 2.1, as well as the optimal solutions obtained in step 2.2 and step 2.3, as the main structural parameters for the initial structure of the athermal optical system;

Step 3: inputting the main structural parameters of the initial structure obtained in step 2.4 into optical design software, further adjusting the curvature radius, thickness, and air gap of each lens, analyzing image quality of the initial structure, and obtaining the initial structure of the athermal optical system.

Further, step 2.1 specifically includes:

step 2.1.1: determining the number of lenses of the athermal optical system, and taking the focal length and chromatic aberration of the athermal optical system as preliminary optimization objectives, establishing the evaluation function $F_1$ according to the preliminary optimization objectives, as follows:

$$F_1 = w_1 f_1^2 + w_2 f_2^2$$

$$f_1 = \sum_{i=1}^{N} \phi_i - \varphi$$

$$f_2 = \sum_{i=1}^{N} \frac{\phi_i}{V_i}$$

Wherein, $f_1$ is a deviation between a sum of the focal lengths of all lenses and a target total focal length, $f_2$ is an achromatic condition of the athermal optical system, i is an ith lens, $w_1$ and $w_2$ are weight coefficients, N is the number of lenses, $\varphi$ is a total optical power of the athermal optical system, $\phi_i$ is the optical power of the ith lens, and $V_i$ is the Abbe number of the material of the ith lens;

Step 2.1.2: initializing parameters, wherein the parameters includes swarm size n, number of iterations T, dimension D, inertia weight w, learning factors $c_1$, $c_2$, and position and velocity of particles;

step 2.1.3: using a rand function to randomly generate a series of particles with random velocity and position, and ensuring that the position and velocity of the particles are within an range specified in step 2.1.2;

Step 2.1.4: substituting positions of initial particles into the evaluation function $F_1$ of step 2.1.1, calculating the current fitness value of the particles, and using the current fitness value of the particles as an historical optimal solution for each particle in a first iteration and a global optimal solution for the particle swarm;

Step 2.1.5: performing iterations and updating the velocity and position of particles at each iteration;

Step 2.1.6: recalculating fitness of particles and updating the historical optimal solution of each particle and the global optimal solution of the particle swarm;

Step 2.1.7: repeating steps 2.1.5 and 2.1.6 until a termination condition is met; finally, obtaining a set of optimal solutions, which includes the optical power $\phi$ and the Abbe number V of the material of each lens;

Further, step 2.1.5 specifically includes:

Updating the velocity and position of particles according to a velocity formula and a position formula at each iteration;

The velocity formula is as follows:

$$v_{kj}(t+1) = wv_{kj}(t) + c_1 r_1(t)\left[pbest_{kj}(t) - x_{kj}(t)\right] + c_2 r_2(t)\left[gbest_j(t) - x_{kj}(t)\right]$$

wherein, $v_{kj}$ is a velocity of kth particle in jth dimension, $r_1$ and $r_2$ are random numbers, t is number of iterations, $pbest_{kj}$ is an historical optimal solution of kth particle in jth dimension, gbest; is a global optimal solution of the particle swarm in the jth dimension, and $x_{kj}$ is a position of kth particle in jth dimension;

The position formula is as follows:

$$x_{kj}(t+1) = x_{kj}(t) + v_{kj}(t+1).$$

Further, step 2.1.6 specifically includes:

Substituting a current position of the kth particle into the evaluation function $F_1$ to obtain a current fitness value fit(k) of the particle; if fit(k)>$pbest_{kj}$(k), replace $pbest_{kj}$(k) with fit(k); if fit(k)>$gbest_j$(k), replace $gbest_j$(k) with fit(k); $pbest_{kj}$ is a historical optimal solution of the kth particle in the jth dimension, and gbest; is a global optimal solution of the particle swarm in the jth dimension.

Further, step 2.2 specifically includes:

Step 2.2.1: taking the chromatic aberration and the thermal aberration of the athermal optical system as the optimization objectives, and establishing the evaluation function $F_2$ according to the optimization objectives, as follows:

$$F_2 = w_2 f_2^2 + w_3 f_3^2 + w_4 f_4^2$$

$$f_2 = \sum_{i=1}^{N} \frac{\phi_i}{V_i}$$

$$f_3 = \sum_{i=1}^{N} \frac{\phi_i}{V_i} P_i$$

$$f_4 = \sum_{i=1}^{N} \gamma_i \phi_i + \alpha\varphi$$

Wherein, $f_2$ is achromatic condition of the athermal optical system; $f_3$ is apochromatic condition of the athermal optical system, $P_i$ is relative dispersion of a material of the ith lens; $f_4$ is athermal condition of the athermal optical system, $\gamma_i$ is thermal aberration coefficient of the material of the ith lens, and $\alpha$ is thermal expansion coefficient of a mechanical material of lens barrel; $w_2$、 $w_3$, $w_4$ are weight coefficients;

Step 2.2.2: initializing parameters, including swarm size n', number of iterations t', inertia weight w', learning factors $$c_1', c_2',$$

and dimension D'j carrying out continuous integer coding on all materials, representing each material with three-dimensional coordinate points composed of Abbe number $V_i$, relative dispersion $P_i$, and thermal aberration coefficient $\gamma_i$;

The inertia weight w' is dynamically adjusted, and a formula for dynamic adjustment is:

$$w'(t') = w'_{start} - (w'_{start} - w'_{end}) \times \frac{t'}{T_{max}}$$

Wherein, $w'_{start}$ is start inertia weight, $w'_{end}$ is end inertia weight, $T_{max}$ is maximum iteration number;

Step 2.2.3: using the round function to generate a random integer and initializing the velocity and position of the particles;

Step 2.2.4: substituting the positions of the initial particles into the evaluation function $F_2$ in step 2.2.1, calculating the current fitness value of the particles, and using the current fitness value of the particles as the historical optimal solution for each particle and the global optimal solution for the particle swarm in the first iteration;

Step 2.2.5: updating the velocity and position of particles;

Step 2.2.6: recalculating fitness of particles and updating the historical optimal solution of each particle and the global optimal solution of the particle swarm;

Step 2.2.7, repeating steps 2.2.5 and 2.2.6 until the termination condition is reached; finally, obtaining a set of optimal solutions, which includes the Abbe number V of material, the relative dispersion P, and the thermal aberration coefficient γ of each lens.

Further, step 2.2.5 specifically includes:

Updating the velocity and position of particles according to a velocity formula and a position formula at each iteration;

The velocity formula is as follows:

$$v_{k'j}(t'+1) = w'v_{k'j}(t') + c_1'r_1'(t')[pbest_{k'j}(t') - x_{k'j}(t')] + c_2'r_2'(t')[gbest_j'(t') - x_{k'j}(t')]$$

Wherein, $v_{k'j}$ is a velocity of a k'th particle in a jth dimension $$r_1'' r_2''$$

are random numbers, $pbest_{k'j}$ is the historical optimal solution and $$gbest_j'$$

is the global optimal solution of the particle swarm; $x_{k'j}$ is a position of the k'th particle in the jth dimension;

The position formula is as follows:

$$x_{k'j}(t'+1) = x_{k'j}(t') + v_{k'j}(t'+1)\text{。}$$

Further, step 2.2.6 specifically includes:

Substituting a current position of the k'th particle into the evaluation function $F_2$ to obtain a current fitness value fit(k') of the particle; if fit(k')>$pbest_{k'j}$(k'), replace $phest_{k'j}$(k') with fit(k'); if $$\text{fit}(k') > gbest_j', \text{ replace } gbest_j'$$

with fit(k'); $pbest_{k'j}$ is the historical optimal solution of each particle, and $$gbest_j'$$

is the global optimal solution of the particle swarm.

Further, step 2.3 specifically includes:

Step 2.3.1: taking the focal length of the athermal optical system as an optimization objective, and establishing an evaluation function $F_3$ according to the optimization objective, as follows:

$$F_3 = \sum_{i=1}^{N} (\phi_i - \phi_i')^2$$

$$\phi_i' = (n_i - 1)\left(\frac{1}{r_{2i-1}} - \frac{1}{r_{2i}}\right)$$

Wherein, $$\phi_i'$$

is an optimal power of an ith lens; a refractive index of a material of the ith lens; $r_{2i-1}$ is the first surface curvature radius of the ith lens; $r_{2i}$ is the second surface curvature radius of the ith lens; N is an number of lenses, $\phi_i$ is the optical power of the ith lens;

Step 2.3.2: initialisation parameters, including swarm size n", number of iterations t", inertia weight w", learning factors $$c_1'', c_2''$$

and dimension D", as well as a range of position and velocity of particles;

Step 2.3.3: generating randomly a series of particles with random speed and position by using the rand function, and ensuring that the position and speed of particles are within the range specified in step 2.3.2;

Step 2.3.4: calculating the current fitness values of particles; substituting the positions of the initial particles into an evaluation function $F_3$ in step 2.3.1, calculating the current fitness values of particles, and using it as the historical optimal solution for each particle and the global optimal solution for the particle swarm in a first iteration;

Step 2.3.5: updating the velocity and position of particles according to a velocity formula and a position formula;

Step 2.3.6: recalculating the fitness of particles and updating the historical optimal solution of each particle and the global optimal solution of the particle swarm;

Step 2.3.7, repeating steps 2.3.5 and 2.3.6 until a termination condition is reached; finally, obtaining a set of optimal solutions, wherein the optimal solutions include the first curvature radius and the second curvature radius of each lens.

Further, step 2.3.5 specifically includes:

Updating the velocity and position of particles according to a velocity formula and a position formula at each iteration;

The velocity formula is as follows:

$$v_{k'j}(t''+1) = w''v_{k''j}(t'') +$$

-continued $$c_1''r_1''(t'')[pbest_{k''j}(t'')-x_{k''j}(t'')]+c_2''r_2''(t'')[gbest_j''(t'')-x_{k''j}(t'')]$$

Wherein, $v_{k''j}$ is a velocity of a k"th particle in a jth dimension, $$r_1'', r_2''$$

are random numbers, $pbest_{k''j}$ is the historical optimal solution of each particle, and $$gbest_j''(t'')$$

is the global optimal solution of the particle swarm; $x_{k''j}$ is a position of the k"th particle in the jh dimension;

The position formula is as follows:

$$x_{k''j}(t''+1)=x_{k''j}(t'')+v_{k''j}(t''+1)_\circ$$

Further, step 2.3.6 specifically includes:

Substituting a current position of the k"th particle into an evaluation function $F_3$ to obtain a current fitness value fit(k") of the particle; if fit(k")>$pbest_{k''j}$(k"), replace $pbest_{k''j}$(k") with fit(k"); if $$fit(k'')>gbest_j''(t''),$$

replace $$gbest_j''(t'')$$

with fit(k); $poest_{k''j}$ is the historical optimal solution of each particle, and $$gbest_j''(t'')$$

is the global optimal solution of the particle swarm.

Compared with the prior art, the advantageous effects of the present disclosure are:

(1) The method for constructing the initial structure of an athermal optical system based on particle swarm optimization algorithm of the present disclosure provides a new design concept for the athermal optical system, which achieves a reasonable match between optical materials and mechanical materials in the initial structure stage and improves the efficiency of subsequent design optimization.

(2) The method for constructing the initial structure of an athermal optical system based on particle swarm optimization algorithm of the present disclosure provides a new method for selecting optical design materials, which determining the evaluation function according to the system requirements, it is possible to quickly select material combinations that meet the requirements from hundreds of materials, and eliminate optical materials with high cost and poor performance.

(3) The method for constructing the initial structure of an athermal optical system based on particle swarm optimization algorithm of the present disclosure, which can be applied not only to the design of athermal optical systems, but also extended to the design of any refractive optical system by changing the evaluation function, optimizing any other design specifications.

DETAILED DESCRIPTION OF THE EMBODIMENTS

The present disclosure will be further illustrated in combination with the accompanying drawings and exemplary embodiments.

Figure 1:
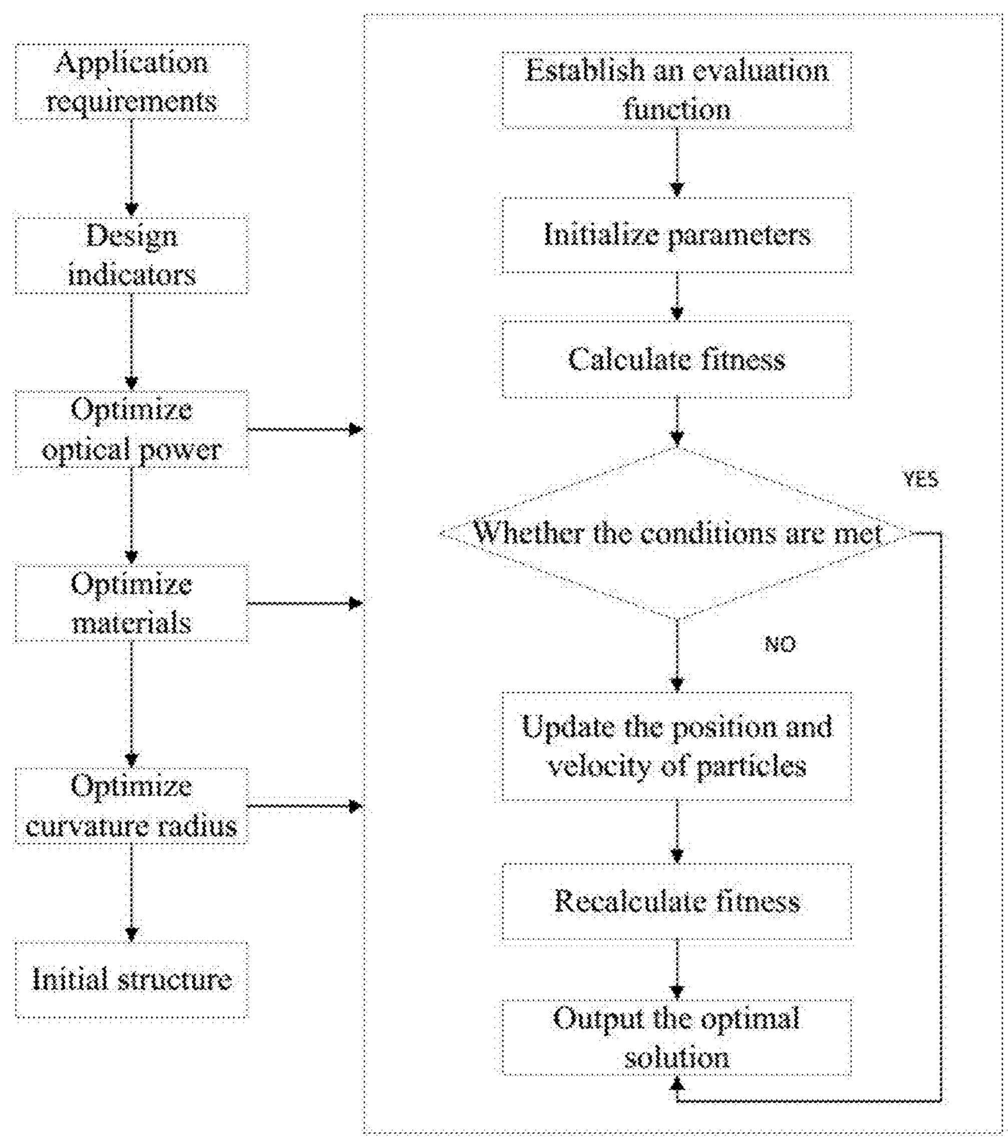
FIG. 1 is a flow diagram of an embodiment of a method for constructing the initial structure of an athermal optical system based on particle swarm optimization algorithm according to the present disclosure.

Referring to FIG. 1, a method for constructing the initial structure of a athermal optical system based on particle swarm optimization algorithm includes the following steps:

Step 1: calculating the design specifications of the athermal optical system based on application requirements. The design specifications includes various indicators such as operating wavelength band, operating temperature range, focal length, field of view angle, aperture, number of lenses, object distance, image distance, total system length, and image quality requirement;

In the embodiment, the design specifications include operating wavelength band, operating temperature range, focal length, field of view angle, aperture, and number of lenses. The operating wavelength band is 450 nm-750 nm, the operating temperature range is −50° C.-70° C., the focal length is 100 mm, the field of view angle is 10°, the aperture is 50 mm, and the number of lenses is 4;

The basic structural parameters to be solved include: optical power, material, curvature radius, thickness, and air gap of each lens, totaling 24 parameters;

Step 2: taking the design specifications from step 1 as an input, obtaining the main structural parameters of the initial structure of the athermal optical system through particle swarm optimization algorithm;

Step 2.1: according to the number of lenses in the athermal optical system, taking the focal length and chromatic aberration of the athermal optical system as preliminary optimization objectives. Establishing the evaluation function $F_1$ according to the preliminary optimization objectives, and obtaining a set of optimal solutions using particle swarm optimization algorithm. The optimal solutions include the optical power @ of each lens and the Abbe number V of the material;

Step 2.1.1: determining the number of lenses in the athermal optical system as 4, and taking the focal length and chromatic aberration of the athermal optical system as preliminary optimization objectives. Establishing the evaluation function $F_1$ according to the preliminary optimization objectives, as follows:

$$F_1 = w_1 f_1^2 + w_2 f_2^2$$

$$f_1 = \sum_{i=1}^{N} \phi_i - \varphi = \phi_1 + \phi_2 + \phi_3 + \phi_4 - 0.01$$

$$f_2 = \sum_{i=1}^{N} \frac{\phi_i}{V_i} = \frac{\phi_i}{v_1} + \frac{\phi_2}{v_2} + \frac{\phi_3}{v_3} + \frac{\phi_4}{v_4}$$

Wherein, $f_1$ is the deviation between the sum of the focal lengths of all lenses and the target total focal length, $f_2$ is the achromatic condition of the athermal optical system, i is the ith lens, $w_1$ and $w_2$ are the weight coefficients, N is the number of lenses, $\varphi$ is the total optical power of the athermal optical system, $\phi_i$ is the optical power of the ith lens, and $V_i$ is the Abbe number of the material of the ith lens;

Step 2.1.2: initializing parameters, wherein the parameters includes swarm size n (number of particles), number of iterations t, dimension D (number of optimization variable $\phi_i$ and optimization variable $V_i$), inertia weight w, learning factors $c_1$ and $c_2$, and position and velocity of particles (range of values for variables $\phi_i$ and $V_i$), as shown in Table 1;

TABLE 1

| Initial parameters | n | t | D | $w_1/w_2$ | w | $c_1/c_2$ | $\phi_1$-$\phi_4$ | $V_1$-$V_4$ |
|---|---|---|---|---|---|---|---|---|
| Value | 50 | 100 | 8 | 0.1 | 0.9 | 0.5 | [−0.01, 0.01] | [15, 90] |

Step 2.1.3: considering an 8-dimensional vector consisting of 8 variables as a particle, using the rand function to randomly generate a series of particles with random velocity and position, and ensuring that the position and velocity of the particles are within the range specified in step 2.1.2;

Step 2.1.4: substituting the positions of the initial particles into the evaluation function $F_1$ of step 2.1.1, calculating the current fitness values of the particles, and using it as the historical optimal solution for each particle in the first iteration and the global optimal solution for the particle swarm;

Step 2.1.5: updating the velocity and position of particles;

Updating the velocity and position of particles according to the velocity formula and position formula at each iteration;

The velocity formula is as follows:

$$v_{kj}(t+1) = wv_{kj}(t) + c_1 r_1(t)\left[pbest_{kj}(t) - x_{kj}(t)\right] + c_2 r_2(t)\left[gbest_j(t) - x_{kj}(t)\right]$$

Wherein, $v_{kj}$ is the velocity of the kth particle in the jth dimension, $r_1$、$r_2$ are random numbers, t is the number of iterations, $pbest_{kj}$ is the historical optimal solution of the kth particle in the jth dimension, and $gbest_j$ is the global optimal solution of the particle swarm in the jth dimension;

The position formula is as follows:

$$x_{kj}(t+1) = x_{kj}(t) + v_{kj}(t+1)$$

Wherein, $x_{kj}$ is the position of the kth particle in the jth dimension;

Step 2.1.6: substituting the current position of the kth particle into the evaluation function $F_1$ to obtain the current fitness value fit(k) of the particle; if fit(k)>$pbest_{kj}$(k), replace $pbest_{kj}$(k) with fit(k); if fit(k)>$gbest_j$(k), replace $gbest_j$(k) with fit(k);

Step 2.1.7, repeating steps 2.1.5 and 2.1.6 until the termination condition is met (such as reaching the preset number of iterations); finally, obtaining a set of optimal solutions, which include the optical power $\phi$ and the Abbe number V of the material of each lens;

In the embodiment, after 100 iterations, a set of optimal solutions is obtained as: $\phi_1$=0.0074, $\phi_2$=0.0023, $\phi_3$=0.0048, $\phi_4$=−0.0025, $V_1$=38.51, $V_2$=87.92, $V_3$=22.80, $V_4$=76.29;

Step 2.2: taking the chromatic aberration and thermal aberration of the athermal optical system as optimization objectives, and establishing an evaluation function $F_2$ according to the optimization objectives; substituting the optimal solutions obtained in step 2.1.7 into the evaluation function $F_2$, optimizing the material combination of the athermal optical system using particle swarm optimization algorithm, and obtaining a set of optimal solutions, including the Abbe number V of the material, the relative dispersion P, and the thermal aberration coefficient $\gamma$ of each lens;

Step 2.2.1: taking the chromatic aberration and thermal aberration of the athermal optical system as the optimization objectives, and establishing an evaluation function $F_2$ according to the optimization objectives, as follows:

$$F_2 = w_2 f_2^2 + w_3 f_3^2 + w_4 f_4^2$$

$$f_2 = \sum_{i=1}^{N} \frac{\phi_i}{V_i} = \frac{\phi_i}{V_1} + \frac{\phi_2}{V_2} + \frac{\phi_3}{V_3} + \frac{\phi_4}{V_4}$$

$$f_3 = \sum_{i=1}^{N} \frac{\phi_i}{V_i} P_i = \frac{\phi_i}{V_1} P_1 + \frac{\phi_2}{V_2} P_2 + \frac{\phi_3}{V_3} P_3 + \frac{\phi_4}{V_4} P_4$$

$$f_4 = \sum_{i=1}^{N} \gamma_i \phi_i + \alpha\varphi = \gamma_1\phi_1 + \gamma_2\phi_2 + \gamma_3\phi_3 + \gamma_4\phi_4 + 0.236$$

Wherein, $f_2$ is the achromatic condition of the athermal optical system; $f_3$ is the apochromatic condition of the athermal optical system, $P_i$ is the relative dispersion of the material of the ith lens; $f_4$ is the athermal condition of the athermal optical system, $\gamma_i$ is the thermal aberration coefficient of the material of the ith lens, and a is the thermal expansion coefficient of the mechanical material of the lens barrel; $w_2$, $w_3$, $w_4$ are weight coefficients;

Step 2.2.2: initializing parameters, including swarm size n', number of iterations t', inertia weight w', learning factors $$c_1', c_2',$$

and dimension D' (number of lens materials); carrying out continuous integer coding on all materials, representing each material with three-dimensional coordinate points composed of Abbe number, relative dispersion, and thermal aberration coefficient, for a total of 251 materials;

In the embodiment, n'=100, t'=500, $$c_1' = c_2' = 0.5,$$

D'=4, the inertia weight w' is dynamically adjusted to better balance the global search ability and local search ability of the algorithm. The dynamic adjustment formula is:

$$w'(t') = w'_{start} - (w'_{start} - w'_{end}) \times \frac{t'}{T_{max}}$$

Wherein, $w'_{start}$ is the start inertia weight, $w'_{end}$ is the end inertia weight, $T_{max}$ is the maximum iteration number, generally taken as $w'_{start}$=0.4, $w'_{end}$=0.9;

Step 2.2.3: using the round function to generate a random integer and initializing the velocity and position of the particles;

Step 2.2.4: substituting the positions of the initial particles into the evaluation function $F_2$ in step 2.2.1, calculating the current fitness value of the particles, and using it as the historical optimal solution for each particle and the global optimal solution for the particle swarm in the first iteration;

Step 2.2.5: updating the velocity and position of particles according to the velocity formula and position formula;

The velocity formula is as follows:

$$v_{k'j}(t'+1) = w' v_{k'j}(t') + c_1' r_1'(t')\left[pbest_{k'j}(t') - x_{k'j}(t')\right] + c_2' r_2'(t')\left[gbest_j'(t') - x_{k'j}(t')\right]$$

Wherein, $v_{k'j}$ is the velocity of the k'th particle in the jth dimension, $$r_1', r_2'$$

are random numbers, $pbest_{k'j}$ is the historical optimal solution of the k'th particle in the jth dimension, and $gbest'_{jj}$ is the global optimal solution of the particle swarm in the jth dimension;

The position formula is as follows:

$$x_{k'j}(t'+1) = x_{k'j}(t') + v_{k'j}(t'+1)$$

Figure 2:
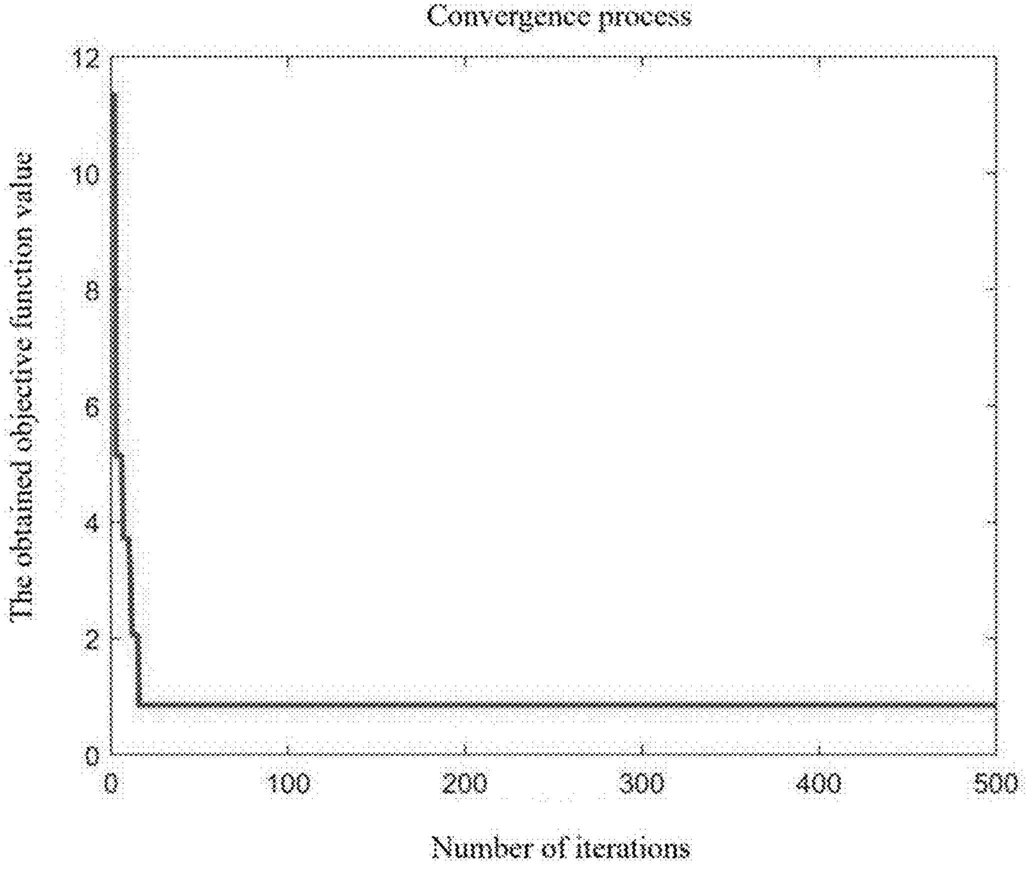
FIG. 2 is the convergence curve map obtained in step 2.2 of the embodiment of the present disclosure.

Wherein, $x_{k'j}$ is the position of the k'th particle in the jth dimension;

Step 2.2.6: substituting the current position of the k'th particle into the evaluation function $F_2$ to obtain the current fitness value fit(k') of the particle; if fit(k')> $pbest_{k'j}$(k'), replace $pbest_{k'j}$(k') with fit(k'); if $$\text{fit}(k') > gbest_j', \text{ replace } gbest_j'$$

with fit(k');

Step 2.2.7, repeating steps 2.2.5 and 2.2.6 until the termination condition is reached; finally, obtaining a set of optimal solutions, which includes the Abbe number V, the relative dispersion P, and the thermal aberration coefficient γ of the material of each lens;

In the embodiment, after 500 iterations, the material codes for each lens are obtained as 59, 62, 33, and 208, corresponding to D-K9, D-LAF53, H-BAK4, and H-ZF72, respectively. The convergence curve map is shown in FIG. 2, where the horizontal axis represents the number of iterations and the vertical axis represents the evaluation function $F_2$. The smaller the evaluation function $F_2$, the better the imaging quality of the optical system corresponding to the optimization result;

Step 2.3: taking the focal length of the athermal optical system as the optimization objectives, and establishing an evaluation function $F_3$ according to the optimization objectives; substituting the optimal solutions obtained in steps 2.1 and 2.2 into the evaluation function $F_3$, optimizing the curvature radius of each lens using particle swarm optimization algorithm, and obtaining a set of optimal solutions, including the first surface curvature radius and the second surface curvature radius of each lens;

Step 2.3.1: taking the focal length of the athermal optical system as the optimization objective, and establishing an evaluation function $F_3$ according to the optimization objective, as follows:

$$F_3 = \sum_{i=1}^{N}(\phi_i - \phi_i')^2 = (\phi_1 - \phi_1')^2 + (\phi_2 - \phi_2')^2 + (\phi_3 - \phi_3')^2 + (\phi_4 - \phi_4')^2$$

$$\phi_i' = (n_i - 1)\left(\frac{1}{r_{2i-1}} - \frac{1}{r_{2i}}\right)$$

Wherein, $$\phi_i'$$

is the optical power of the ith lens, the refractive index of the material of the ith lens; $r_{2i-1}$ is the first surface curvature radius of the ith lens; $r_{2i}$ is the second surface curvature radius of the ith lens;

Step 2.3.2: initialisation parameters, including swarm size n", number of iterations t", inertia weight w", learning factors $$c_1'', c_2''$$

and dimension D" (number of curvature radius of optimization variables), as well as the range of position and velocity of the particles. The values are shown in Table 2:

TABLE 2

| Initial parameters | n" | t" | D" | w" | c"$_1$/c"$_1$ | $r_{2i-1}/r_{2i}$ |
|---|---|---|---|---|---|---|
| Value | 50 | 500 | 8 | 0.9 | 0.5 | [−500, 500] |

Step 2.3.3: generating randomly a series of particles with random speed and position by using rand function, and ensuring that the position and speed of particles are within the range specified in step 2.3.2;

Step 2.3.4: calculating the current fitness values of the particles; substituting the positions of the initial particles into the evaluation function in step 2.3.1, calculating the current fitness values of the particles, and using it as the historical optimal solution for each particle and the global optimal solution for the particle swarm in the first iteration;

Step 2.3.5: updating the velocity and position of particles according to the velocity formula and the position formula;

The velocity formula is as follows:

$$v_{k''j}(t''+1) = w''v_{k'j}(t'') + c_1''r_1''(t')\left[pbest_{k''j}(t'') - x_{k''j}(t'')\right] + c_2''r_2''(t'')\left[gbest_j''(t'') - x_{k''j}(t'')\right]$$

Wherein, $v_{k''j}$ is the velocity of the k"th particle in the jth dimension, $$r_1'', r_2''$$

are random numbers, $pbest_{k''j}$ is the historical optimal solution of the k"th particle in the jth dimension, and $$gbest_j''(t'')$$

is the global optimal solution of the particle swarm in the jth dimension;

The position formula is as follows:

$$x_{k''j}(t''+1) = x_{k''j}(t'') + v_{k''j}(t''+1)$$

Wherein, $x_{k''j}$ is the position of the k"th particle in the jth dimension;

Step 2.3.6: substituting the current position of the k"th particle into the evaluation function $F_3$ to obtain the current fitness value fit(k") of the particle; if fit(k") >$pbest_{k''j}$(k"), replace $pbest_{k''j}$(k") with fit(k"); if $$fit(k'') > gbest_j''(t''), \text{ replace } gbest_j''(t'')$$

with fit(k");

Step 2.3.7, repeating steps 2.3.5 and 2.3.6 until the termination condition is reached; finally, obtaining a set of optimal solutions, which includes the first curvature radius and second curvature radius of each lens; in the embodiment, after 500 iterations, a set of optimal solutions is obtained as shown in Table 3:

TABLE 3

| Curvature radius | $r_1$ | $r_2$ | $r_3$ | $r_4$ | $r_5$ | $r_6$ | $r_7$ | $r_8$ |
|---|---|---|---|---|---|---|---|---|
| Result/mm | 101.29 | −224.20 | −355.09 | −169.19 | 163.23 | −390.42 | 414.91 | 195.35 |

Step 2.4: taking the optical power of each lens obtained in step 2.1, as well as the optimal solutions obtained in step 2.2 and step 2.3, as the main structural parameters for the initial structure of the athermal optical system, as shown in Table 4:

TABLE 4

| | Curvature radius/mm | Thickness/mm | Material |
|---|---|---|---|
| Objective lens | (inf) infinity | inf | |
| 1 | 56.912 | 10.113 | D-K9 |
| 2 | 248.785 | 14.154 | |
| 3 | −56.479 | 20.005 | D-LAF53 |
| 4 | −50.256 | 1.228 | |
| Aperture | inf | 0.448 | |
| 6 | 136.382 | 4.515 | H-BAK4 |
| 7 | −217.26 | 0.587 | |
| 8 | −65.427 | 11.664 | H-ZF72 |
| 9 | −108.736 | 79.993 | |
| Image plane | INF | — | |

Figure 3:
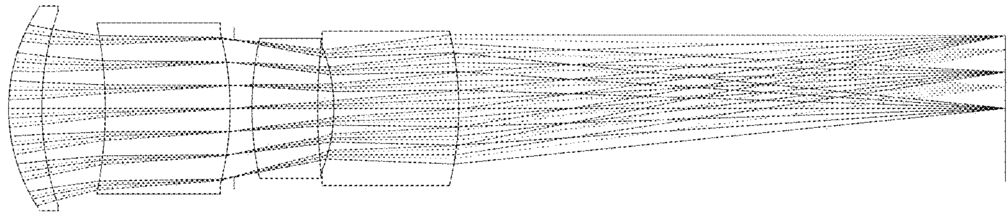
FIG. 3 is a schematic diagram of the initial structure of the athermal optical system obtained in step 3 of the embodiment of the present disclosure.
Figure 4:
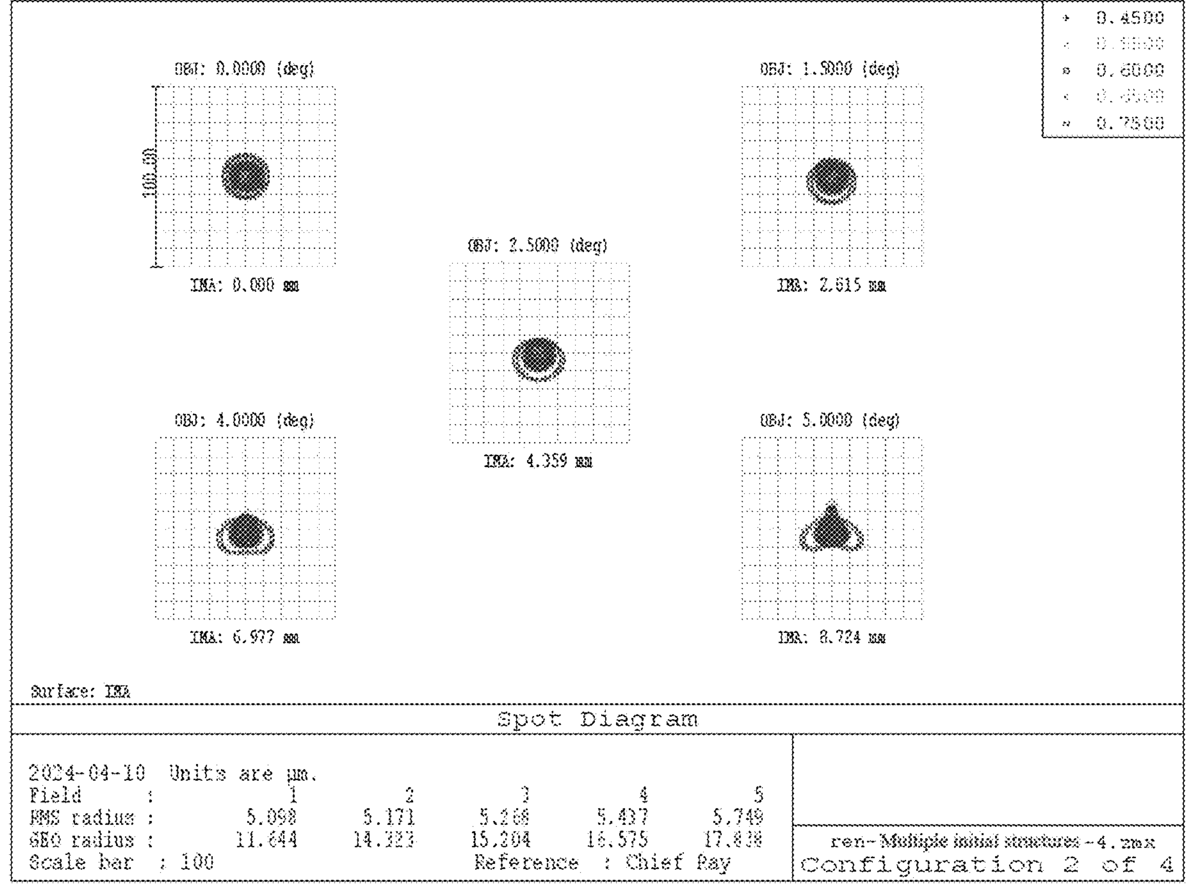
FIG. 4 is a spot diagram of the athermal optical system obtained in step 3 of the embodiment of the present disclosure at −50° C.
Figure 5:
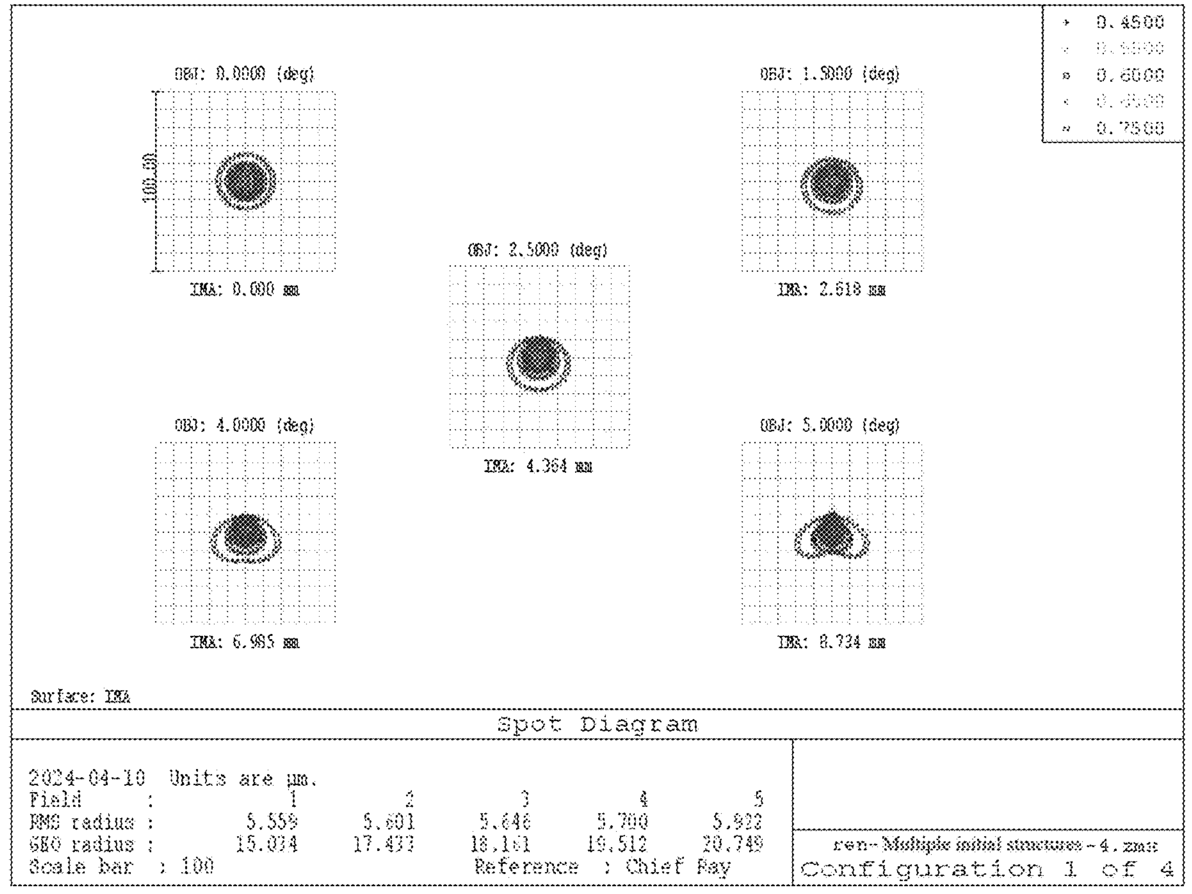
FIG. 5 is a spot diagram of the athermal optical system obtained in step 3 of the embodiment of the present disclosure at 20° C.
Figure 6:
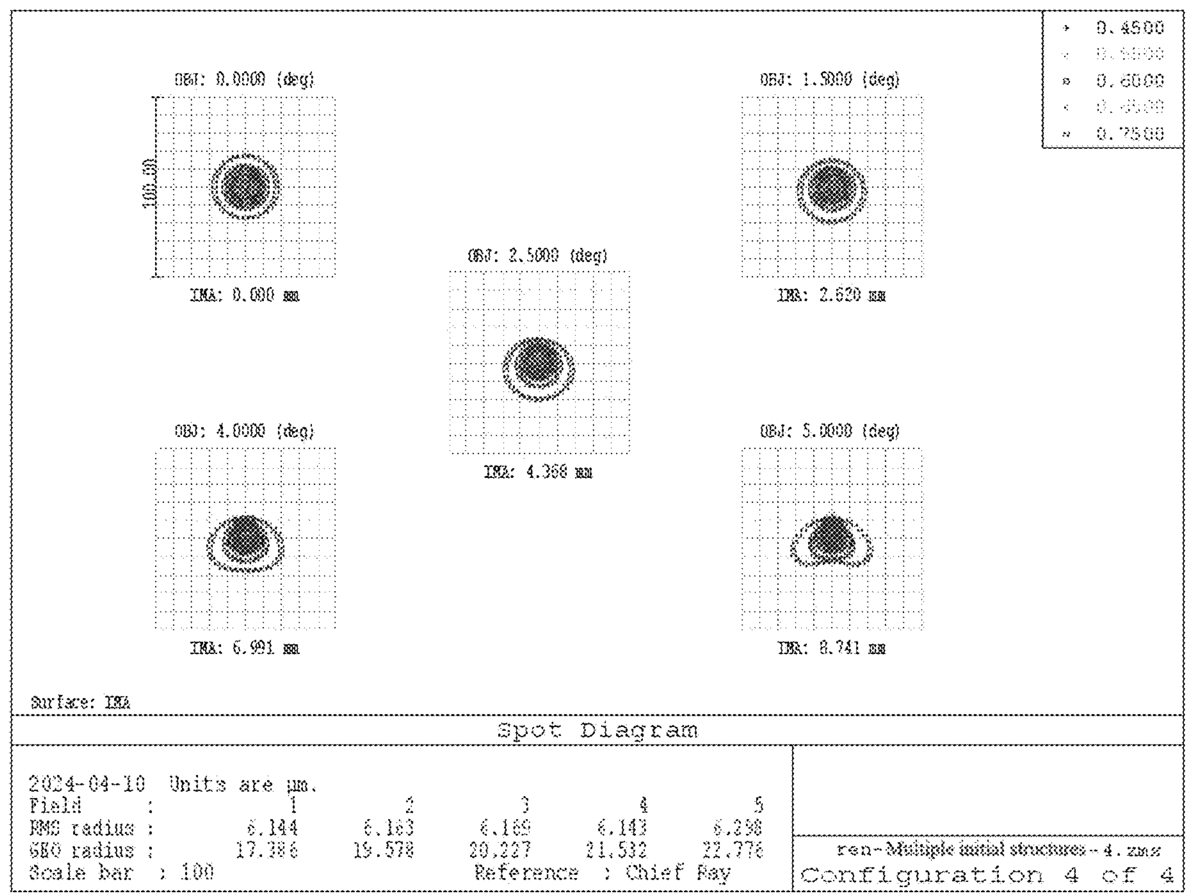
FIG. 6 is a spot diagram of the athermal optical system obtained in step 3 of the embodiment of the present disclosure at 70° C.
Figure 7:
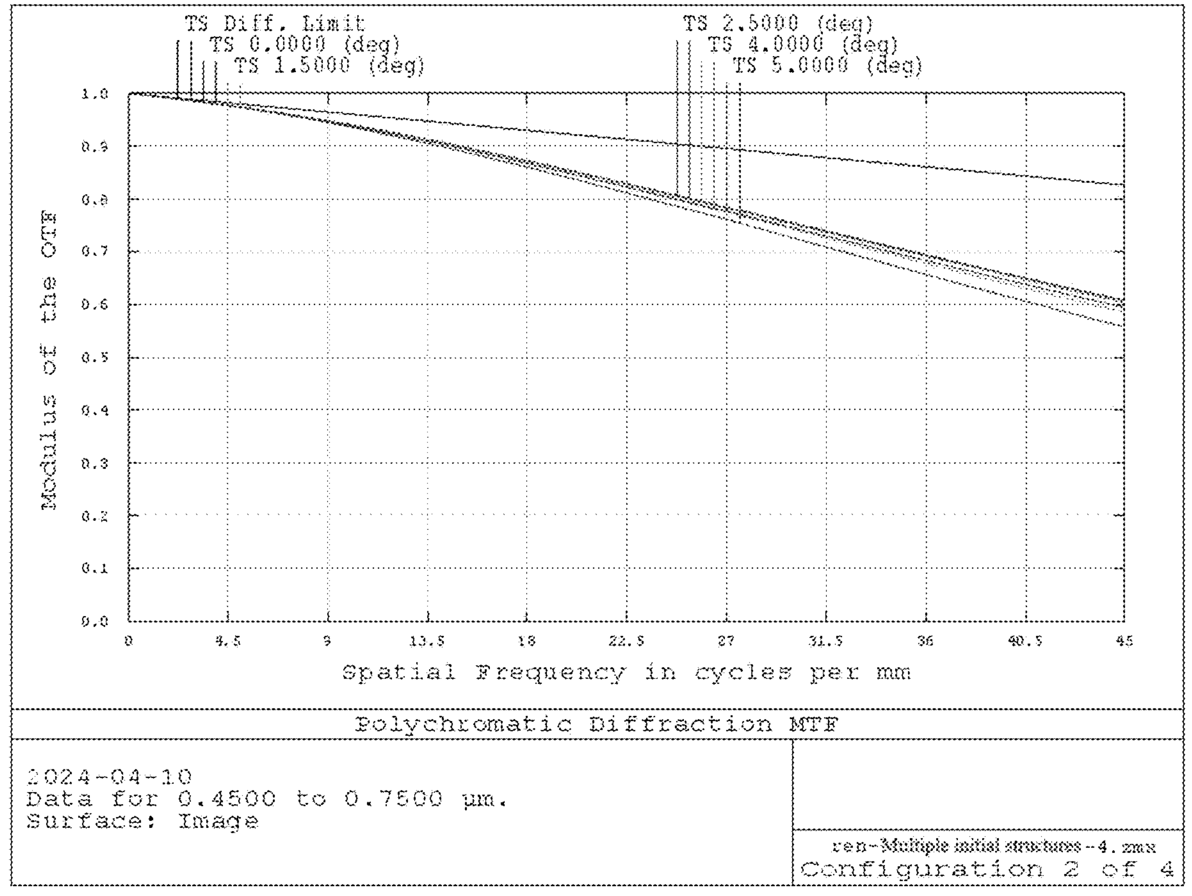
FIG. 7 is the modulation transfer function of the athermal optical system obtained in step 3 of the embodiment of the present disclosure at −50° C.
Figure 8:
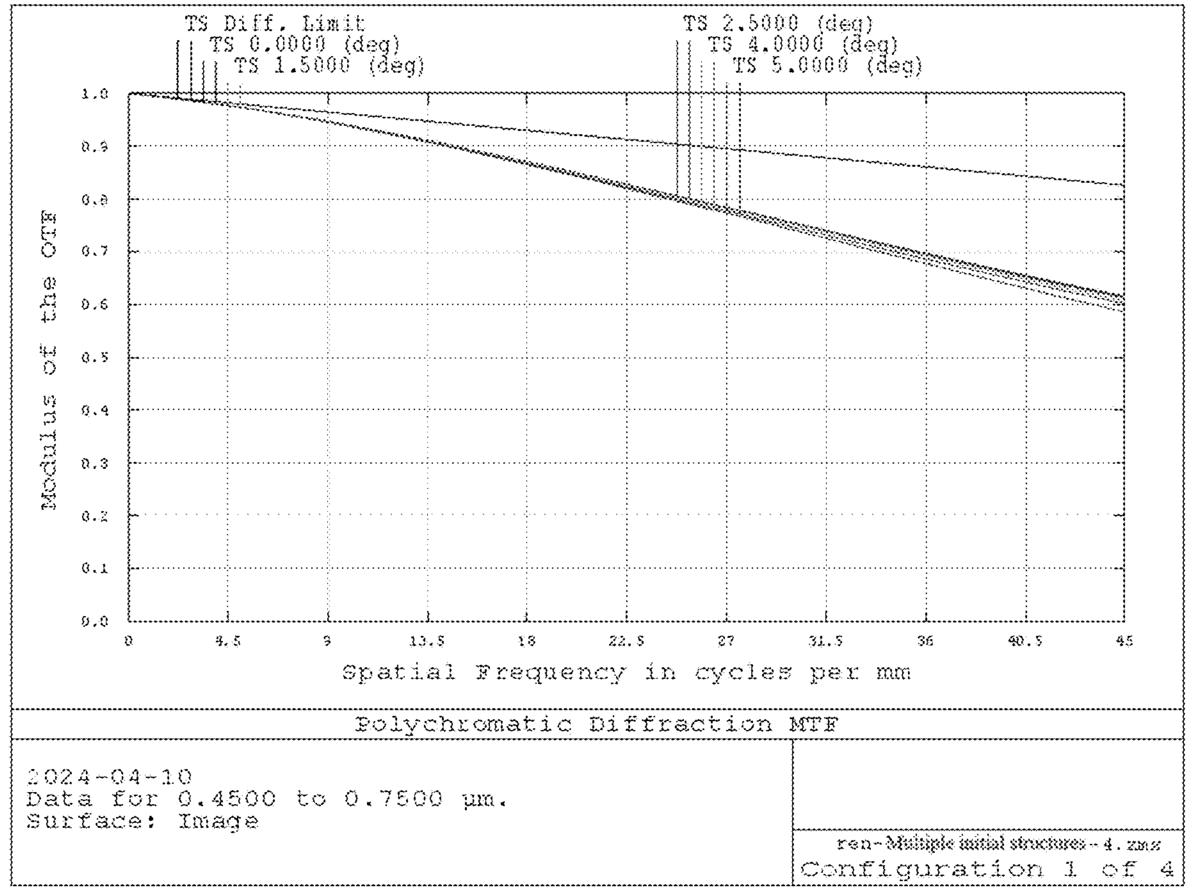
FIG. 8 is the modulation transfer function of the athermal optical system obtained in step 3 of the embodiment of the present disclosure at 20° C.
Figure 9:
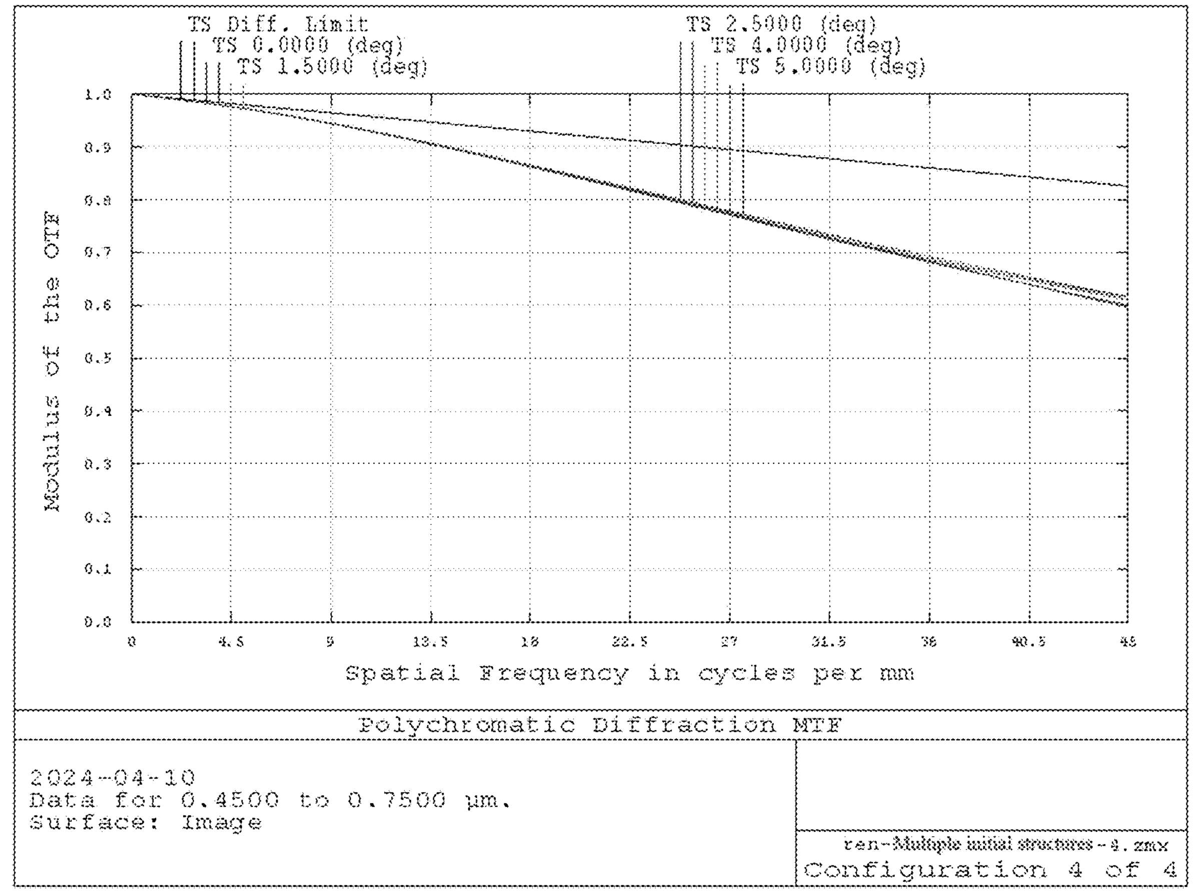
FIG. 9 is the modulation transfer function of the athermal optical system obtained in step 3 of the embodiment of the present disclosure at 70° C.

Step 3: inputting the main structural parameters of the initial structure obtained in step 2.4 into the optical design software, further adjusting the curvature radius, thickness, and air gap of each lens, analyzing the image quality of the initial structure, and obtaining the initial structure of the athermal optical system shown in FIG. 3. FIGS. 4 to 6 are the spot diagrams of the athermal optical system at different temperatures, and it can be seen that the radius of the spot diagrams does not change much at different temperatures. FIGS. 7 to 9 are the modulation transfer functions of the athermal optical system at different temperatures, all of which are greater than 0.5@45 lp/Mm, meets the design requirements.

What is claimed is:

1. A method for constructing an initial structure of an athermal optical system based on particle swarm optimization algorithm, comprising following steps:

step 1: calculating design specifications of the athermal optical system based on application requirements;

the design specifications comprise various indicators, wherein the various indicators comprises operating wavelength band, operating temperature range, focal length, field of view angle, aperture, number of lenses, object distance, image distance, total system length, and image quality requirement;

step 2: taking the design specifications from step 1 as an input, obtaining main structural parameters of the initial structure of the athermal optical system through the particle swarm optimization algorithm;

step 2.1: according to the number of lenses in the athermal optical system, taking the focal length and chromatic aberration of the athermal optical system as preliminary optimization objectives, establishing an evaluation function $F_1$ according to the preliminary optimization objectives, and obtaining a set of optimal solutions using the particle swarm optimization algorithm, the optimal solutions comprise optical power $\phi$ and Abbe number V of material of each lens;

step 2.2: taking the chromatic aberration and thermal aberration of the athermal optical system as optimization objectives, and establishing an evaluation function $F_2$ according to the optimization objectives; substituting the optimal solutions obtained in step 2.1 into the evaluation function $F_2$, optimizing an material combination of the athermal optical system using the particle swarm optimization algorithm, and obtaining a set of optimal solutions, including the Abbe number V of material, relative dispersion P, and thermal aberration coefficient $\gamma$ of each lens;

step 2.3: taking the focal length of the athermal optical system as a optimization objective, and establishing an evaluation function $F_3$ according to the optimization objective; substituting the optimal solutions obtained in steps 2.1 and 2.2 into the evaluation function $F_3$, optimizing curvature radius of each lens using the particle swarm optimization algorithm, and obtaining a set of optimal solutions, including a first surface curvature radius and a second surface curvature radius of each lens;

step 2.4: taking the optical power $\phi$ of each lens obtained in step 2.1, as well as the optimal solutions obtained in step 2.2 and step 2.3, as the main structural parameters for the initial structure of the athermal optical system;

step 3: inputting the main structural parameters of the initial structure obtained in step 2.4 into optical design software, further adjusting the curvature radius, thickness, and air gap of each lens, analyzing image quality of the initial structure, and obtaining the initial structure of the athermal optical system.

2. The method for constructing the initial structure of the athermal optical system based on particle swarm optimization algorithm according to claim 1, wherein step 2.1 comprises:

step 2.1.1: determining the number of lenses of the athermal optical system, and taking the focal length and the chromatic aberration of the athermal optical system as preliminary optimization objectives, establishing the evaluation function $F_1$ according to the preliminary optimization objectives, as follows:

$$F_1 = w_1 f_1^2 + w_2 f_2^2$$

$$f_1 = \sum_{i=1}^{N} \phi_i - \varphi$$

$$f_2 = \sum_{i=1}^{N} \frac{\phi_i}{V_i}$$

wherein, $f_1$ is a deviation between a sum of focal lengths of all lenses and a target total focal length, $f_2$ is an achromatic condition of the athermal optical system, i is an ith lens, $w_1$ and $w_2$ are weight coefficients, N is the number of lenses, $\varphi$ is a total optical power of the athermal optical system, $\phi_i$ is the optical power of the ith lens, and $V_i$ is the Abbe number of the material of the ith lens;

step 2.1.2: initializing parameters, wherein the parameters comprises swarm size n, number of iterations T, dimension D, inertia weight w, learning factors $c_1$, $c_2$, and position and velocity of particles;

step 2.1.3: using a rand function to randomly generate a series of particles with random velocity and position, and ensuring that the position and velocity of the particles are within an range specified in step 2.1.2;

step 2.1.4: substituting positions of initial particles into the evaluation function $F_1$ of step 2.1.1, calculating the current fitness values of the particles, and using the current fitness values of the particles as an historical optimal solution for each particle in a first iteration and a global optimal solution for the particle swarm;

step 2.1.5: performing iterations and updating the velocity and position of particles at each iteration;

step 2.1.6: recalculating fitness values of the particles and updating the historical optimal solution of each particle and the global optimal solution of the particle swarm;

step 2.1.7: repeating steps 2.1.5 and 2.1.6 until a termination condition is met; finally, obtaining a set of optimal solutions, wherein the optimal solutions comprise the optical power $\phi$ and the Abbe number V of the material of each lens.

3. The method for constructing the initial structure of the athermal optical system based on particle swarm optimization algorithm according to claim 2, wherein step 2.1.5 comprises:

updating the velocity and position of particles according to a velocity formula and a position formula at each iteration;

the velocity formula is as follows:

$$v_{kj}(t+1) = wv_{kj}(t) + c_1 r_1(t)\left[pbest_{kj}(t) - x_{kj}(t)\right] + c_2 r_2(t)\left[gbest_j(t) - x_{kj}(t)\right]$$

wherein, $v_{kj}$ is a velocity of kth particle in jth dimension, $r_1$ and $r_2$ are random numbers, t is number of iterations, $pbest_{kj}$ is an historical optimal solution of kth particle in jth dimension, $gbest_j$ is a global optimal solution of the particle swarm in the jth dimension, and $x_{kj}$ is a position of kth particle in jth dimension;

the position formula is as follows:

$$x_{kj}(t+1) = x_{kj}(t) + v_{kj}(t+1).$$

4. The method for constructing the initial structure of the athermal optical system based on particle swarm optimization algorithm according to claim 2, wherein step 2.1.6 comprises:

substituting a current position of the kth particle into the evaluation function $F_1$ to obtain a current fitness value fit(k) of the particle; if fit(k)>$pbest_{kj}$(k), replacing $pbest_{kj}$(k) with fit(k); if fit(k)>$gbest_j$(k), replacing $gbest_j$(k) with fit(k); $pbest_{kj}$ is a historical optimal solution of the kth particle in the jth dimension, and $gbest_j$ is a global optimal solution of the particle swarm in the jth dimension.

5. The method for constructing the initial structure of the athermal optical system based on particle swarm optimization algorithm according to claim 1, wherein step 2.2 comprises:

step 2.2.1: taking the chromatic aberration and the thermal aberration of the athermal optical system as the optimization objectives, and establishing the evaluation function $F_2$ according to the optimization objectives, as follows:

$$F_2 = w_2 f_2^2 + w_3 f_3^2 + w_4 f_4^2$$

$$f_2 = \sum_{i=1}^{N} \frac{\phi_i}{V_i}$$

$$f_3 = \sum_{i=1}^{N} \frac{\phi_i}{V_i} P_i$$

$$f_4 = \sum_{i=1}^{N} \gamma_i \phi_i + \alpha\varphi$$

wherein, $f_2$ is achromatic condition of the athermal optical system; $f_3$ is apochromatic condition of the athermal optical system, $P_i$ is relative dispersion of a material of the ith lens; $f_4$ is athermal condition of the athermal optical system, $\gamma_i$ is thermal aberration coefficient of the material of the ith lens, and a is thermal expansion coefficient of a mechanical material of lens barrel; $w_2$, $w_3$, $w_4$ are weight coefficients;

step 2.2.2: initializing parameters, wherein the parameters comprises swarm size n', number of iterations t', inertia weight w', learning factors $$c_1', c_2',$$

and dimension D'; carrying out continuous integer coding on all materials, representing each material with three-dimensional coordinate points composed of Abbe number $V_i$, relative dispersion $P_i$, and thermal aberration coefficient $\gamma_i$;

the inertia weight w' is dynamically adjusted, and a formula for dynamic adjustment is:

$$w'(t') = w'_{start} - (w'_{start} - w'_{end}) \times \frac{t'}{T_{max}}$$

wherein, $w'_{start}$ is start inertia weight, $w'_{end}$ is end inertia weight, $T_{max}$ is maximum iteration number;

step 2.2.3: using the round function to generate a random integer and initializing the velocity and position of the particles;

step 2.2.4: substituting the positions of the initial particles into the evaluation function $F_2$ in step 2.2.1, calculating the current fitness values of the particles, and using the current fitness values of the particles as the historical optimal solution for each particle and the global optimal solution for the particle swarm in the first iteration;

step 2.2.5: updating the velocity and position of particles;

step 2.2.6: recalculating fitness values of the particles and updating the historical optimal solution of each particle and the global optimal solution of the particle swarm;

step 2.2.7, repeating steps 2.2.5 and 2.2.6 until the termination condition is reached; finally, obtaining a set of optimal solutions, wherein the optimal solutions comprises the Abbe number V of material, the relative dispersion P, and the thermal aberration coefficient $\gamma$ of each lens.

6. The method for constructing the initial structure of the athermal optical system based on particle swarm optimization algorithm according to claim 5, wherein step 2.2.5 comprises:

updating the velocity and position of particles according to a velocity formula and a position formula at each iteration;

the velocity formula is as follows:

$$v_{k'j}(t'+1) = w' v_{k'j}(t') + c_1' r_1'(t')\left[pbest_{k'j}(t') - x_{k'j}(t')\right] + c_2' r_2'(t')\left[gbest_j'(t') - x_{k'j}(t')\right]$$

wherein, $v_{k'j}$ is a velocity of a k'th particle in a jth dimension, $$r_1', r_2'$$

are random numbers, $pbest_{k'j}$ is the historical optimal solution of the k'th particle in the jth dimension, $gbest_j'$ is the global optimal solution of the particle swarm in the jth dimension, and $x_{k'j}$ is a position of the k'th particle in the jth dimension;

the position formula is as follows:

$$x_{k'j}(t'+1) = x_{k'j}(t') + v_{k'j}(t'+1).$$

7. The method for constructing the initial structure of the athermal optical system based on particle swarm optimization algorithm according to claim 5, wherein step 2.2.6 comprises:

substituting a current position of the k'th particle into the evaluation function $F_2$ to obtain a current fitness value fit(k') of the particle; if fit(k') >$pbest_{k'j}$(k'), replacing $pbest_{k'j}$(k') with fit(k'); if fit(k')>$gbest_j'$, replacing $gbest_j'$ with fit(k'); $pbest_{k'j}$ is a historical optimal solution of the k'th particle in the jth dimension, and $gbest_j'$ is a global optimal solution of the particle swarm in the jth dimension.

8. The method for constructing the initial structure of the athermal optical system based on particle swarm optimization algorithm according to claim 1, wherein step 2.3 comprises:

step 2.3.1: taking the focal length of the athermal optical system as an optimization objective, and establishing an evaluation function $F_3$ according to the optimization objective, as follows:

$$F_3=\sum_{i=1}^{N}(\phi_i-\phi_i')^2$$

$$\phi_i'=(n_i-1)\left(\frac{1}{r_{2i-1}}-\frac{1}{r_{2i}}\right)$$

wherein, $\phi_i'$ is an optical power of an ith lens; a refractive index of a material of the ith lens; $r_{2i-1}$ is the first surface curvature radius of the ith lens; $r_{2i}$ is the second surface curvature radius of the ith lens; N is an number of lenses, $\phi_i$ is the optical power of the ith lens;

step 2.3.2: initializing parameters, wherein the parameters comprise swarm size n", number of iterations t", inertia weight w", learning factors $$c_1'', c_2''$$

and dimension D", as well as a range of position and velocity of particles;

step 2.3.3: generating randomly a series of particles with random speed and position by using the rand function, and ensuring that the position and speed of particles are within the range specified in step 2.3.2;

step 2.3.4: calculating the current fitness values of particles; substituting the positions of the initial particles into the evaluation function $F_3$ in step 2.3.1, calculating the current fitness values of particles, and using the current fitness values of particles as the historical optimal solution for each particle and the global optimal solution for the particle swarm in a first iteration;

step 2.3.5: updating the velocity and position of particles according to a velocity formula and a position formula;

step 2.3.6: recalculating the fitness of particles and updating the historical optimal solution of each particle and the global optimal solution of the particle swarm;

step 2.3.7, repeating steps 2.3.5 and 2.3.6 until a termination condition is reached; finally, obtaining a set of optimal solutions, wherein the optimal solutions comprise the first curvature radius and the second curvature radius of each lens.

9. The method for constructing the initial structure of the athermal optical system based on particle swarm optimization algorithm according to claim 8, wherein step 2.3.5 comprises:

updating the velocity and position of particles according to a velocity formula and a position formula at each iteration;

the velocity formula is as follows:

$$v_{k''j}(t''+1)=w''v_{k''j}(t'')+c_1''r_1''(t'')\left[pbest_{k''j}(t'')-x_{k''j}(t'')\right]+c_2''r_2''(t'')\left[gbest_j''(t'')-x_{k''j}(t'')\right]$$

wherein, $v_{k''j}$ is a velocity of a k"th particle in a jth dimension, $$r_1'', r_2''$$

are random numbers, $pbest_{k''j}$ is the historical optimal solution of the k"th particle in the jth dimension, $$gbest_j''(t'')$$

is the global optimal solution of the particle swarm in the jth dimension, and $x_{k''j}$ is a position of the k"th particle in the jh dimension;

the position formula is as follows:

$$x_{k''j}(t''+1)=x_{k''j}(t'')+v_{k''j}(t''+1).$$

10. The method for constructing the initial structure of the athermal optical system based on particle swarm optimization algorithm according to claim 8, wherein step 2.3.6 specifically comprises:

substituting a current position of the k"th particle into an evaluation function $F_3$ to obtain a current fitness value fit(k") of the particle; if fit(k")>$pbest_{k''j}$(k"), replace $pbest_{k''j}$(k") with fit(k"); if fit(k")>$gbest_j$"(t"), replace $gbest_j$"(t") with fit(k"); $pbest_{k''j}$ is the historical optimal solution of the k"th particle in the jth dimension, and $gbest_j$"(t") is the global optimal solution of the particle swarm in the jth dimension.

11. The method for constructing the initial structure of the athermal optical system based on particle swarm optimization algorithm according to claim 6, wherein step 2.2.6 comprises:

substituting a current position of the k'th particle into the evaluation function $F_2$ to obtain a current fitness value fit(k') of the particle; if fit(k')>$pbest_{k'j}$(k'), replacing $pbest_{k'j}$(k') with fit(k'); if fit(k')>$gbest_j$', replacing $gbest_j$' with fit(k'); $pbest_{k'j}$ is a historical optimal solution of the k'th particle in the jth dimension, and $gbest_j$' is a global optimal solution of the particle swarm in the jth dimension.

12. The method for constructing the initial structure of the athermal optical system based on particle swarm optimization algorithm according to claim 9, wherein step 2.3.6 specifically comprises:

substituting a current position of the k"th particle into an evaluation function $F_3$ to obtain a current fitness value fit(k") of the particle; if fit(k")>$pbest_{k''j}$(k"), replace $pbest_{k''j}$(k") with fit(k"); if fit(k")>$gbest_j$"(t"), replace $gbest_j$"(t") with fit(k"); $pbest_{k''j}$ is the historical optimal solution of the k"th particle in the jth dimension, and $gbest_j$"(t") is the global optimal solution of the particle swarm in the jth dimension.

* * * * *